Patented May 6, 1941

2,240,714

UNITED STATES PATENT OFFICE 2,240,714

CATALYTIC OXIDATION OF KETONES

John J. Owen, Baton Rouge, La., assignor to Standard Oil Development Company, a corporation of Delaware No Drawing. Application December 24, 1938, Serial No. 247,633

9 Claims. (Cl. 260—541)

This invention relates to an improved process for the catalytic oxidation of ketones.

It is shown in the United States Letters Patent 2,005,183, granted June 18, 1935, to Flemming and Speer, that ketones are oxidized to carboxylic acids by subjecting ketones corresponding to the general formula $RCOR_1$, in which R denotes an alkyl, cycloalkyl, aralkyl or aryl radical and $R_1$ an alkyl, cycloalkyl or aralkyl radical, or in which R and $R_1$ are connected with each other as members of a non-aromatic ring system, to oxidation in the liquid phase by means of oxygen-containing gas, i. e., oxygen or a gas containing oxygen, such as air or air-enriched oxygen, for example containing 50% of oxygen, in the presence of oxidation catalysts.

Improved catalysts for the oxidation of ketones as described in the aforesaid patent have now been found, by which high yields of carboxylic acids are obtained at a greatly increased rate of reaction, thereby affording great advantages in increased capacity and reduced operating costs for this process.

The improved catalysts of this invention comprise compounds in which manganese is present in the anion and an alkali metal is present in the cation. Examples of such catalyst are potassium permanganate, potassium manganate, sodium permanganate, sodium manganate, and other corresponding manganese compounds with the alkali metals or ammonium.

While these improved catalysts may be used alone or in admixture with each other and/or with other oxidation catalysts, particularly those of the said Flemming and Speer patent, it has also been found that still further improvements in the ketone oxidation process are obtained by using, in addition to the manganate type catalysts, a small amount of another compound of an alkali or alkaline earth metal with the exception of the manganates and permanganates. This second group of catalysts includes the alkali and alkaline earth oxides, hydroxides, carbonates and acid carbonates. Also organic compounds of such metals as the soaps of fatty acids and the salts of other organic acids. Also metal alcoholates and matello-organic compounds in which an organic radical is connected to the said metal by a carbon to metal linkage. Salts of the said metals with inorganic acids and other inorganic compounds of these metals are also included; it being preferred, however, that such compounds be free of metals of Groups IV to VIII of the Periodic Table of Elements. Examples of preferred compounds of this second group are sodium oxide, sodium hydroxide, soda ash and the corresponding potassium compounds. Also, the sodium and potassium salts of fatty acids, such as the acetates, butyrates, palmitates, oleates, stearates and the like (carbonates and bicarbonates of sodium and potassium).

The following examples illustrate suitable processes for carrying out the invention described herein:

Example I

In 422 grams of glacial acetic acid is dissolved 13 grams of methyl ethyl ketone. To this solution 2 grams of sodium permanganate is added, and the reaction mixture is blown with oxygen at the rate of 15 liters per hour at a temperature of 102–103° C. The oxidation is continued under these conditions for 8¼ hours, during which period additional methyl ethyl ketone is added until a total of 123 grams is introduced. Analysis of the reaction product showed that based on the total methyl ethyl ketone there was converted 86% to acids, 1.4% to intermediates, and 8.1% to water, carbon dioxide and carbon monoxide with 4.5% unaccounted for.

Example II 100 grams of methyl ethyl ketone is dissolved in 350 grams of glacial acetic acid. 0.5 gram of potassium permanganate and 0.25 gram of soda ash are added to this solution. The mixture is then oxidized by blowing with oxygen for six hours at about 105° C. The oxidation product is predominately acetic acid.

Example III

A series of comparative tests on the oxidation of methyl ethyl ketone was conducted with different catalysts in the same apparatus and under similar operating conditions. In each case a solution in glacial acetic acid of the freshly distilled ketone (3 to 10%) and the catalyst (0.5%) was placed in a tall, narrow reaction vessel packed with glass Raschig rings and heated to the operating temperature. Oxygen was then passed through the solution at such a rate that it was continually in excess, about 25 to 50% being unabsorbed, and then through a reflux condenser, a dry ice trap and a scrubber containing aqueous sodium bisulfite. Additional ketone was supplied continually to the bottom of the reaction vessel and reaction products were withdrawn from the side near the top of the vessel so that both the ketone concentration and the liquid level in the reactor remained practically constant. During the run samples of both the liquid product and the exit gases were taken periodically to determine the concentration of ketone in the liquid product and also the concentration of oxygen, carbon dioxide and carbon monoxide in the gaseous products. At the completion of each run the concentration of crude acids, calculated as acetic acid, and of methyl ethyl ketone was determined on the total liquid product. The results of several comparative runs are presented in the following table:

Example V

Oxygen was passed at atmospheric pressure through a solution of methyl n-propyl ketone in glacial acetic acid (averaging 3.7% concentration throughout the run) maintained at 104 to 109° C. for 5.75 hours. Sodium permanganate was used as the catalyst, in a concentration of 0.5%. There was thus obtained a yield of about 80% of crude fatty acids, of which about half was pro-

*Direct oxidation of methyl ethyl ketone at atmospheric pressure*

|  |  | A | B | C | D | E (air) | F |
|---|---|---|---|---|---|---|---|
| Catalyst | | Mn (Ac)$_2$ | NaMnO$_4$ | NaMnO$_4$ | NaMnO$_4$ | NaMnO$_4$ | NaMnO$_4$+NaAc |
| Catalyst concentration | percent | 0.5 | 0.4 | 0.5 | 0.045 | 0.5 | 0.45   2.5 |
| Temp | °C | 103–104 | 102–103 | 100–103 | 102–103 | 102–103 | 100–103 |
| Duration of run in hours | | 6.33 | 8.25 | 6.25 | 6.75 | 7 | 6.75 |
| O$_2$ rate | liter/hr | 8 | 15 | 12.5 | 10 | 19.5 | 12.5 |
| Average MEK conc | percent | 2.1 | 4.8 | 2.8 | 3.5 | 4.1 | 2.4 |
| Crude acid produced | mols | 0.63 | 2.00 | 1.63 | 1.47 | 0.75 | 2.08 |
| Mol percent of MEK reacted | | 59 | 68.5 | 82.5 | 75 | 54 | 88 |
| Mol percent yield of crude acids (based on MEK reacted) | | 90 | 85.5 | 81.5 | 81 | 89.5 | 87.5 |
| Crude acid | mols/hr | 0.10 | 0.24 | 0.26 | 0.22 | 0.11 | 0.31 |

A comparison of runs B, C, and D with Run A demonstrates that the rate of oxidation with sodium permanganate catalysts is more than double the rate with manganese acetate catalysts, as indicated by the mols of crude acid produced per hour. The addition of sodium acetate to the sodium permanganate catalyst in Run F resulted in still higher reaction rates, as shown in a comparison of Run F with Runs B, C, and D.

Run E is comparable with Run B except that air was used in place of oxygen. The oxidation rate was correspondingly lower due to the decrease in the partial pressure of the oxygen, although it is significant that the sodium permanganate catalyst of Run E showed an equal production rate of crude acid, using air, to the manganese acetate of Run A in which oxygen was used.

Example IV

In order to determine the effect of higher pressures, several tests were made in which a solution in glacial acetic acid of from 5 to 20% of methyl ethyl ketone and 0.5% of sodium permanganate catalyst was oxidized at a temperature of 100 to 130° C. while passing oxygen through the solution at pressures of 75 to 150 lbs. per square inch. The yield of acids was about the same as in the runs with the same catalyst described in Example III, while the rate of acid production was more than double the rate obtained when operating with pure oxygen at atmospheric pressure.

Increasing the reaction temperature to 132° C. increased substantially the losses of ketone to carbon monoxide and carbon dioxide, with corresponding reduction in yield of acids.

The crude acids formed in all the oxidation tests described above consisted of acetic acid of high concentration, an illustrative product containing 93.6% acetic acid, 2.3% formic acid and 3.8% propionic acid (Run E of Example III).

Other acids, such as propionic acid, are also prepared by oxidation of suitable ketones, with the improved catalysts of this invention. For example, propionic acid is formed by oxidation of methyl isopropyl ketone, ethyl n-propyl ketone, ethyl isopropyl ketone, diethyl ketone, and mixtures of such ketones. The following example illustrates this process:

pionic acid.

While the conditions for the oxidation of ketones described in the said Flemming and Speer patent are in general suitable when using the improved catalyst of the present invention, it has been found that with the manganate type catalysts it is generally preferable to use a concentration of the ketone in a carboxylic acid, such as acetic acid, above about 3%. The use of lower concentrations of ketones with these catalysts results in increased loss to gaseous products such as carbon monoxide and carbon dioxide.

In some instances it may be observed that the oxidation rate decreases after the catalyst has been in use for some time. This may be due either to reduction in the catalyst concentration by withdrawal of liquid from the reaction zone, or to some decrease in the initial activity of the catalyst. In either case, the addition of small amounts of fresh catalyst from time to time to the reaction vessel maintains the oxidation rate at a substantially constant high level.

This invention is not to be limited to any specific examples or theoretical explanations presented herein, all such being intended solely for purpose of illustration, but is limited only by the following claims in which it is desired to claim all novelty in so far as the prior art permits.

I claim:

1. Process for the catalytic oxidation of ketones which comprises subjecting a ketone, having the carbonyl group connected to at least one aliphatic atom, to oxidation, in the liquid phase, by means of a gas containing oxygen, in the presence of a catalyst containing a compound having manganese in the anion and an alkali metal in the cation, said compound being present in an amount substantially less than that required for chemical oxidation of the ketone.

2. Process according to claim 1 in which the said catalyst compound comprises MnO$_4$ radical as the anion, and an alkali metal as the cation.

3. Process according to claim 1 in which the said catalyst comprises a permanganate of an alkali metal.

4. Process according to claim 1 in which the said catalyst comprises sodium permanganate.

5. Process according to claim 1 in which the said oxidation is conducted at a temperature below about 130° C.

6. Process for the catalytic oxidation of ketones which comprises subjecting a ketone, having the carbonyl group connected to at least one aliphatic atom, to oxidation, in the liquid phase, by means of a gas containing oxygen, in the presence of a catalyst containing a compound having manganese in the anion and an alkali metal in the cation and a compound of a metal selected from the group consisting of alkali and alkaline earth metals with the exception of manganates and permanganates, said compound being present in an amount substantially less than that required for chemical oxidation of the ketone.

7. Process according to claim 6 in which the said second compound is an alkali metal salt of a fatty acid.

8. Process according to claim 6 in which the said second compound is an alkaline oxy compound of an alkali metal.

9. Process according to claim 6 in which the said catalyst comprises sodium permanganate and sodium acetate.

JOHN J. OWEN.